United States Patent [19]

Wada et al.

[11] 4,003,959

[45] Jan. 18, 1977

[54] EPOXY RESIN COMPOSITIONS CONTAINING CYCLOPENTADIENE COPOLYMER

[75] Inventors: Akira Wada, Kamakura; Kazunobu Karino, Yokohama, both of Japan

[73] Assignee: Nippon Zeon Co., Ltd., Tokyo, Japan

[22] Filed: Dec. 16, 1974

[21] Appl. No.: 533,249

[30] Foreign Application Priority Data

Dec. 20, 1973  Japan .................. 48-142616

[52] U.S. Cl. .............. 260/837 R; 260/37 EP; 260/42.32; 260/830 P; 260/831; 260/834; 260/835; 260/836

[51] Int. Cl.² .................. C08L 63/00

[58] Field of Search .................. 260/836, 837

[56] References Cited

UNITED STATES PATENTS

| | | | |
|---|---|---|---|
| 3,028,359 | 4/1962 | Gaylord | 260/837 R |
| 3,098,835 | 7/1963 | Gaylord | 260/837 R |
| 3,249,651 | 5/1966 | Gaylord | 260/837 R |
| 3,496,129 | 2/1970 | Wismer | 260/80.78 |
| 3,582,516 | 6/1971 | LeBlanc | 260/53 EP |

FOREIGN PATENTS OR APPLICATIONS

| | | |
|---|---|---|
| 47-44028 | 11/1972 | Japan |
| 48-06942 | 3/1973 | Japan |
| 1,055,444 | 1/1967 | United Kingdom |

*Primary Examiner*—Paul Lieberman
*Attorney, Agent, or Firm*—Sherman & Shalloway

[57] ABSTRACT

An epoxy resin composition comprising (I) 5 to 90% by weight of a cyclopentadiene resin, (II) 95 to 10% by weight of an epoxy resin and (III) an effective amount of a curing agent for the epoxy resin, having an acid number of not more than 150, a bromine number of not more than 75 and a softening point of not more than 170° C., said cyclopentadiene resin (I) being prepared from a mixture consisting of A. 85 to 35% by weight of a compound having a cyclopentadiene skeleton, B. 15 to 65% by weight of unsaturated nitriles, unsaturated monocarboxylic acids or their esters, alkenyl alkanoates derived from aliphatic monocarboxylic acids and vinyl alcohol or allyl alcohol, $\alpha,\beta$-unsaturated dicarboxylic acids or their mono- and di-esters and unsaturated aldehydes, C. 0 to 30% by weight of $\alpha,\beta$-unsaturated dicarboxylic anhydrides and D. 0 to 30% by weight of unsaturated hydrocarbon compounds.

3 Claims, No Drawings

EPOXY RESIN COMPOSITIONS CONTAINING CYCLOPENTADIENE COPOLYMER

This invention relates to a novel epoxy resin composition containing a specific cyclopentadiene resin. More specifically, the invention relates to an epoxy resin composition having well-balanced properties such as impact strength, acid resistance, alkali resistance, hot water resistance and oil resistance suitable for use as coating agents such as varnish lacquer, paint or enamel and sealing agents.

Epoxy resins have found wide variety of applications, for example, as adhesives, casting materials or coatings.

The use as paints is especially noteworthy. But since epoxy resins are expensive, compositions containing epoxy resins and asphalt or coal tar are used as cheap tar epoxy paints curable at room temperature. The tar epoxy paints however are not available in clear colors, and are used only in limited applications as primer paints. It has also been known to use modified or unmodified coumarone-indene resins conjointly with epoxy resins, but the resulting compositions are not satisfactory in respect of color and odor. In particular, the unmodified coumaroneindene resins have insufficient compatibility with epoxy resins, and do not give satisfactory results. Furthermore, since coal tar and the coumarone-indene resins are derivatives of coal tar, their supply has recently become unstable. The coal tar, moreover, presents hygienic problems, and modifiers or extenders for epoxy resins, which can substitute for these compounds, have been desired.

In an attempt to meet this desire, it was proposed to use an epoxidized vegetable oil conjointly. The epoxidized vegetable oil, however, exhibits only an insufficient effect of modifying epoxy resins, and when incorporated in great quantities, causes the degradation of various properties of epoxy resin cured products.

On the other hand, it is known to use linseed oil, dehydrated castor oil and linseed oil fatty acids modified with maleic anhydride as a curing agent for epoxy resins. However, the resulting epoxy resin compositions generally require heating at a temperature of 100° to 200° C. or higher for curing, and the resulting cured products are brittle.

It has also been known to use liquid polybutadiene modified with maleic acid as a curing agent for epoxy resins (Japanese Patent Publication No. 39182/70). However, according to this method, an organic peroxide such as benzoyl peroxide or dicumyl peroxide or a metal oxide such as a manganese dioxide or cobalt oxide must be used as a cross-linking catalyst and heating at high temperatures are required in order to obtain cured products of good quality.

Japanese Patent Publication No. 25894/69 discloses an epoxy resin composition capable of being cured at room temperature and consisting of a resinous polymer comprising an $\alpha,\beta$-unsaturated olefinic dicarboxylic acid (anhydride) and a polymerizable monoolefin compound as essential ingredients, a methylolated guanamine derivative and an epoxy resin containing an internal epoxy group. However, epoxy resin compositions comprising a glycidyl ether type epoxy resin have inferior flexibility.

Various investigations have been made in the art about commercially available petroleum resins in an attempt to develop extenders or modifiers having superior compatibility with epoxy resins and curing agents of the room temperature curing type such as amines, amine adducts and fatty acid (poly) amides, but no satisfactory compound has ever been discovered.

We made investigations into commercially available aromatic or aliphatic petroleum resins, cyclopentadiene resins, coumarone resins, rosin esters, maleic acid modified products of the rosin esters, and phenolmodified rosin, etc., but failed to find any compound which has superior compatibility with the epoxy resins and the curing agents. Attempts to incorporate these compounds in epoxy resins did not result in cured products of satisfactory properties.

Further investigation finally led to the discovery that an epoxy resin composition containing a specific cyclopentadiene resin having the constituents to be described gives a cured coating having well-balanced properties such as impact strength, acid resistance, alkali resistance, hot water resistance, and oil resistance at low cost.

According to this invention, there is provided a resin composition comprising (I) a cyclopentadiene resin obtainable from a mixture consisting of (A) a compound having a cyclopentadiene skeleton, (B) a specific monoolefinic compound containing a polar group such as a cyano or carbonyl group, (C) an $\alpha,\beta$-unsaturated dicarboxylic anhydride as an optional constituent, and/or (D) and unsaturated hydrocarbon as an optional constituent, (II) an epoxy resin and (III) a curing agent for the epoxy resin.

Needless to say, the composition of this invention comprising the above constituents (I), (II) and (III) may, if desired, contain an inorganic filler such as talc, gypsum, alumina or asbestos, a reactive diluent such as glycidyl ester or glycidyl ether, an organic filler or flexibility-imparting agent such as wooden powder, tar, phenolic resins, urea resins, melamine resins, polyester resins or polyamide resins, or a pigment.

The invention will be described below in greater details.

The compound (A) having a cyclopentadiene skeleton used as one of the starting materials for the preparation of the cyclopentadiene resin (I) may, for example, be cyclopentadiene, methylcyclopentadiene, Diels-Alder adducts such as cyclopentadiene, dicyclopentadiene, methylcyclopentadiene dimer, cyclopentadiene and methylcyclopentadiene tri- or tetra-mers, or mixtures thereof. Since cyclopentadiene exists stably as dicyclopentadiene at room temperature, both of them can usually be employed equally.

The specific monoolefinic compound (B) containing a polar group such as a cyano or carbonyl group, which is the other starting material for the synthesis of the cyclopentadiene resin (I), is at least one compound selected from the group consisting of (1) unsaturated nitriles containing 3 to 6 carbon atoms such as acrylonitrile, methacrylonitrile or vinylidene cyanide, (2) unsaturated monocarboxylic acids containing 3 to 4 carbon atoms such as acrylic acid, methacrylic acid, crotonic acid or vinylacetic acid, (3) unsaturated monocarboxylic acid esters derived from the above unsaturated monocarboxylic acids and aliphatic alcohols containing 1 to 8 carbon atoms such as methyl alcohol, ethyl alcohol, propyl alcohol, butyl alcohol or octanol, or glycides, (4) alkenyl alkanoates derived from aliphatic monocarboxylic acids containing 1 to 4 carbon atoms such as formic acid, acetic acid, propionic acid and butyric acid and vinyl alcohol or allyl alcohol, (5) $\alpha,\beta$-unsaturated dicarboxylic acids containing 4 to 5 carbon atoms such as maleic acid, fumaric acid, citraconic acid or itaconic acid, and α,β-unsaturated dicarboxylic acid monoesters or diesters derived from the above α,β-unsaturated dicarboxylic acids and the above aliphatic alcohols containing 1 to 8 carbon atoms or glycides, and (6) unsaturated aldehydes containing 3 to 6 carbon atoms such as acrolein, methacrolein, crotonaldehyde or methyl-crotonaldehyde.

Examples of the compound (3) are methyl acrylate, ethyl acrylate, propyl acrylate, butyl acrylate, 2-ethylhexyl acrylate, glycidyl acrylate, methyl methacrylate, ethyl methacrylate, butyl methacrylaete, 2-ethylhexyl methacrylate, methyl crotonate, ethyl crotonate, butyl crotonate, glycidyl crotonate, methylvinylacetate, and ethyl vinylacetate.

Examples of the alkenyl alkanoate (4) are vinyl formate, vinyl acetate, vinyl propionate, vinyl butyrate, allyl formate, allyl propionate and allyl butyrate.

Examples of the α,β-unsaturated dicarboxylic acid monoesters and diesters (5) are mono- or dimethyl esters, mono- or diethyl esters, mono- or dibutyl esters, mono- or di-2-ethylhexyl esters, and mono- or diglycides of maleic acid, fumaric acid, citraconic acid and itaconic acid.

Of the monoolefinic compounds (B), the unsaturated nitriles (1), the unsaturated monocarboxylic acid esters (3) and alkenyl alkanoates (4) are especially preferred. In particular, acrylonitrile, methyl methacrylate and vinyl acetate are especially preferred.

The α,β-dicarboxylic acid anhydride (C) containing 4 to 5 carbon atoms used as an optional component for preparing the cyclopentadiene resin (I) includes, for example, maleic anhydride, citraconic anhydride and itaconic anhydride. Examples of the unsaturated hydrocarbon (D) containing 3 to 10 carbon atoms are monolefinic hydrocarbons such as propylene, butene, pentene, cyclopentene, hexene, cyclohexene, styrene, α-methylstyrene or indene, diolefinic hydrocarbons such as butadiene, isoprene or piperylene, and high-boiling mixtures containing unsaturated hydrocarbons containing 3 to 10 carbon atoms formed as byproducts in the production of ethylene by the thermal cracking of naphtha, etc.

The cyclopentadiene resin (I) includes not only unmodified cyclopentadiene resin obtained by heating the above compounds (A) and (B) and the optional components (C) and/or (D), but also hydrogenated cyclopentadiene resin and maleic acid-modified cyclopentadiene resin, and in any case has an acid number of not more than 150, a bromine number of not more than 75 and a softening point of not more than 170° C.

Some procedures are available for the practice of the method of producing the cyclopentadiene resin (I). For example, it can be produced by the methods disclosed in U.S. Pat. Nos: 2,559,790, 2,689,232, and 2,689,240.

According to one specific example of the method, a mixture consisting of the cyclopentadiene compound (A), the monoolefinic compound (B) and as optional components, the α,β-unsaturated dicarboxylic anhydride (C) and/or the unsaturated hydrocarbon (D) is heated in an inert gaseous atmosphere in a pressure reactor at a temperature of 200° to 300° C., preferably 250° to 280° C., for 0.5 to 20 hours, preferably 1 to 10 hours, in the presence or absence of an inert hydrocarbon solvent such as benzene, toluene or xylene. Then, the unreacted materials and the solvent are removed by evaporation or other customary purification procedures for polymers to produce the cyclopentadiene resin (I).

In the preparation of the cyclopentadiene resin (I), the components (A), (B), (C) and (D) may be added to the reaction system separately from each other continuously or successively.

The proportions of the components in the preparation of the cyclopentadiene resin (I) are 85 to 35% by weight, preferably 80 to 50% by weight, for the compound (A), 15 to 65% by weight, preferably 20 to 50% by weight, for the compound (B), and 0 to 30% by weight, preferably 1 to 20% by weight, each of the α,β-unsaturated dicarboxylic anhydride (C) and the unsaturated hydrocarbon (D).

When the proportion of the compound (A) exceeds 85% by weight, and the proportion of the compound (B) is less than 15% by weight, the resulting cyclopentadiene resin has low compatibility with epoxy resins, and a cured coating of an epoxy resin composition containing such a cyclopentadiene has a rough and non-uniform surface and exhibits poor mechanical strengths such as resistance to abrasion or flexibility.

If the proportion of the cyclopentadiene compound (A) is less than 35% by weight, and the proportion of the polymerizable monomer (B) exceeds 65% by weight, the cyclopentadiene resin obtained is considerably colored, and a cured coating of an epoxy resin composition containing such a cyclopentadiene resin has poor resistance to hot water and to chemicals.

Cyclopentadiene resins having an acid value (as measured in accordance with JIS K5902) of not more than 150 preferably not more than 100, more preferably 10-100, obtained by using not more than 30% by weight of the α,β-unsaturated dicarboxylic anhydride (C), based on the total reaction mixture give cured coatings having superior oil resistance. However, when the acid value exceeds 150, the softening point of the resin is markedly increased to degrade its compatibility with epoxy resins. Moreover, cured coatings of an epoxy resin containing such a resin have a rough and non-uniform surface, and exhibit poor mechanical characteristics.

Of cyclopentadiene resins obtained by the methods hereinabove or hereinbelow described, those having a softening point, as measured by the ring and ball method (JIS K 2531), of not more than 170° C., preferably 170° to 50° C., are used advantageously in this invention. Resins having a softening point of more than 170° C. have poor compatibility with epoxy resins, and in the same way as above, the surface condition and mechanical characteristics of cured coatings obtained from the resulting epoxy resin compositions are degraded.

In order to obtain cyclopentadiene resins having the desired softening point, the reaction temperature, the reaction time, the combination of starting materials, the proportions of the starting materials charged and the amount of the diluent must be properly determined since these conditions have relation to each other. When the combination of the starting materials and the proportions of the materials to be charged are predetermined, resins having the desired softening point can be obtained by properly changing the reaction temperature and the reaction time. Generally, the higher the reaction temperature and the longer the reaction time, the higher is the softening point of the resulting resin.

As another method for adjusting the softening point of the cyclopentadiene resin, the unsaturated hydrocarbon (D) is used in an amount of not more than 30% by weight, preferably 1 to 20% by weight, based on the weight of all the reactants.

Hydrogenated cyclopentadiene resins having a bromine value of not more than 50, preferably not more than 20, more preferably not more than 1 (measured in accordance with JIS K2543), an acid value of not more than 150, and a softening point of not more than 170° C. prepared by hydrogenating the cyclopentadiene resins obtained by the above method, in accordance with the method disclosed in U.S. Pat. No. 2,319,271, which have reduced coloration and improved weatherability, can also be blended with epoxy resins instead of, or together with, the unmodified cyclopentadiene resin to provide epoxy resin compositions in accordance with this invention.

Maleic anhydride-modified cyclopentadiene resins having a bromine value of not more than 75, an acid value of not more than 150, preferably not more than 100, more preferably 10 to 100, and a softening point of not more than 170° C. can also be blended with epoxy resins instead of, or together with, the unmodified cyclopentadiene resin to provide epoxy resin compositions in accordance with the present invention.

These maleic acid-modified cyclopentadiene resins are produced by adding not more than 30 parts by weight, preferably 2 to 20 parts by weight, of maleic anhydride (based on 100 parts by weight of the solids content of the resin) to the reaction mixture containing a cyclopentadiene resin which is prepared in the above-mentioned manner from a monomeric mixture consisting of the cyclopentadiene compound (A), the mono-olefinic compound (B), and as optional components, the $\alpha,\beta$-unsaturated dicarboxylic anhydride (C) and/or the unsaturated hydrocarbon (D), or to the cyclopentadiene resin obtained by removing the unreacted materials and the solvent from this reaction mixture by evaporation or other known means, heating the mixture at a temperature of 150° to 300° C., preferably 180° to 250° C., for 0.5 to 20 hours, preferably 1 to 10 hours, and then removing the unreacted materials and the solvent by evaporation and other known means.

A wide variety of epoxy resins can be used in this invention as the epoxy resin (II). Generally, commercially available condensation products formed between polyfunctional halohydrins and polyhydric phenols are used conveniently. Typical polyhydric phenols used for the preparation of epoxy resins include, for example, various bisphenols which are condensation products formed between phenols or resorcinols and aldehydes such as formaldehyde, acetaldehyde or acetone or ketones such as methyl ethyl ketone, and low-molecular-weight phenol/aldehyde condensation products (i.e., novolac resins). Typical epoxy resins are the reaction products (of the glycidyl ether type) formed between epichlorohydrin and bisphenol A. The epoxy resin used in this invention is not limited to those exemplified above, but all epoxy compounds containing at least two epoxy groups in the molecule can be used in this invention.

In the epoxy resin composition of this invention, the proportion of the cyclopentadiene resin (I) is 5 to 90% by weight, and that of the epoxy resin (II) is 95 to 10% by weight. If the proportion of the cyclopentadiene resin exceeds 90% by weight, the inherent properties of the epoxy resins are impaired. Furthermore, if the proportion of the cyclopentadiene resin (I) is less than 5% by weight, no outstanding effect in improvement can be obtained. Preferably, the composition of this invention contains 5 to 80% by weight of the cyclopentadiene resin. More preferably, the proportion of the cyclopentadiene resin (I) is 10 to 70% by weight.

When it is desired to produce molded articles from the epoxy resin composition of this invention or use it as a coating composition, an effective amount of the curing agent (III) for the epoxy resin (II) is added. Known curing agents for epoxy resins can be used as the curing agents (III). For example, there can be used organic amines such as diethylene triamine, triethylene tetramine, tetraethylene pentamine, p-phenylene diamine or m-phenylene diamine in an amount of about 5 to 30 parts by weight per 100 parts by weight of the epoxy resin, fatty acid polyamides in an amount of about 20 to 150 parts by weight per 100 parts by weight of the epoxy resin, acid anhydrides such as phthalic anhydride, trimellitic anhydride, succinic anhydride or maleic anhydride in an amount of about 30 to 70 parts by weight per 100 parts by weight of the epoxy resin, and a complex between an amine such as aniline, toluidine, diphenylamine or N-methylaniline and boron trifluoride in an amount of about 1 to 10 parts by weight per 100 parts by weight of the epoxy resin. Two or more of these compounds can also be used as the curing agent. The epoxy resin composition of this invention containing a fatty acid polyamide known as a room temperature curing agent as the curing agent (III) is a superior coating composition capable of being cured at room temperature.

The epoxy resin compositions of this invention described above are cheap, and possess well-balanced properties such as impact strength, acid resistance, alkali resistance, hot water resistance, and oil resistance. This will be specifically illustrated by the following Examples.

EXAMPLE 1

1. Preparation of Cyclopentadiene Resin (1)

Unless otherwise specifically described, all cyclopentadiene resins (I) were prepared under the following conditions using a 1-liter autoclave.

| | |
|---|---|
| Dicyclopentadiene (DCPD: variable amount) Vinyl acetate (variable amount) | 480 gr |
| Xylene | 120 gr |
| Reaction temperature: | 260° C. |
| Reaction time: | 3 hours |

The cyclopentadiene resin (I) was obtained by removing the solvent and the unreacted materials from the reaction mixture obtained by performing the reaction under the above conditions.

2. Preparation of Specimens

Solutions A to D of the following formulations were mixed in accordance with the following recipe to form a solution containing the cyclopentadiene resin (I), the epoxy resin (II) and the curing agent (III) is an amount of 37.5% by weight. Using the resulting solution, a coating having a thickness of 100 microns was formed by means of a film applicator on a test plate whose surface had been cleaned by the method stipulated in JIS K5400. The coating was cured at 25° C. for 7 days. The cured coatings were used as specimens for determining the properties of the cured coatings.

| | | |
|---|---|---|
| A) Epoxy resin solution | | |
| Epoxy resin* | 50 | parts by weight |
| Methyl isobutyl ketone | 16 | " |
| Ethyl cellosolve | 17 | " |
| Xylene | 17 | " |
| Total | 100 | " |
| B) Cyclopentadiene resin solution | | |
| Cyclopentadiene resin | 50 | parts by weight |
| Methyl isobutyl ketone | 16 | " |
| Ethyl cellosolve | 17 | " |
| Xylene | 17 | " |
| Total | 100 | " |
| C) Curing agent solution | | |
| Polyamide** | 50 | parts by weight |
| Ethyl cellosolve | 25 | " |
| Xylene | 25 | " |
| Total | 100 | " |
| D) Thinner solution | | |
| Methyl isobutyl ketone | 33 | parts by weight |
| Ethyl cellosolve | 33 | " |
| Xylene | 34 | " |
| Total | 100 | " |

*EPIKOTE (the reaction product of bisphenol A with epichlorohydrin, a product supplied by Mitsubishi Petrochemical Co., Ltd.).
**VERSAMID 125 (a fatty acid polyamide with an amine value of 345, a product supplied by Daiichi General Co., Ltd.)

Blending recipe

| | | |
|---|---|---|
| Cyclopentadiene resin | 25 | parts by weight |
| Epoxy resin (epoxy equivalent of 490) | 75 | " |
| Polyamide | 75 | " |

Using cyclopentadiene resins (I) obtained by using varying amounts of vinyl acetate (VAc) as compound (B), test specimens were prepared and evaluated. The results are shown in Table 1.

Table 1

| Run No. | Present invention | | | | | | | Comparison | | | |
|---|---|---|---|---|---|---|---|---|---|---|---|
| | 1 | 2 | 3 | 4 | 5 | 6 | 7 | 8[a] | 9 | 10[a] | 11 |
| Cyclopentadiene resin (I) | | | | | | | | | | | |
| Proportion of vinyl acetate (wt. %) | 20 | 30 | 40 | 50 | 60 | 20 | — | 0 | 10 | 20 | 70 |
| Proportion of DCPD (wt. %) | 80 | 70 | 60 | 50 | 40 | 60 | — | 100 | 90 | 80 | 30 |
| Proportion of 1.3-pentadiene (wt. %) | — | — | — | — | — | 20 | — | — | — | — | — |
| Softening point (° C; JIS K2531) | 95 | 90 | 74 | 79 | 40 | 58 | — | 95 | 89 | 175 | 30 |
| Gardnor color (ASTM D1544) | 3 | 4 | 4 | 5 | 5 | 3 | — | 3 | 3 | 5 | 10 |
| Bromine Number (JIS K2543) | 63.2 | 62.7 | 59.7 | 60.5 | 56.7 | 64.5 | — | 72.0 | 64.3 | 62.1 | 54.5 |
| State of coating (JIS K5400) | normal | normal | normal | normal | normal | normal | normal | abnormal | abnormal | abnormal | normal |
| Pencil hardness (JIS K5400) | H | H | H | HB | HB | H | HB | | | | 5B |
| Flexing text (JIS K5400; diameter in mm) | below 2 | below 2 | below 2 | below 2 | below 2 | below 2 | below 2 | Not compatible with the epoxy resin | Not compatible with the epoxy resin | Not compatible with the epoxy resin | below 2 |
| Du Pont Impact test (JIS K5400) [(¼")×(gr)×(cm)] | 300× 25 | 500× 25 | 1000× 25 | 300× 25 | 300× 30 | 300× 30 | 300× 20 | | | | 300× 25 |
| Erichsen Cupping test (mm. JIS Z2247) | above 8 | above 8 | above 8 | above 8 | above 8 | above 8 | above 8 | | | | above 8 |
| Acid resistance test (JIS K5400)[1] (10%H₂SO₄aq, 25° C. 7 days) | + | + | + | + | + | + | + | | | | + |
| Alkali resistance test (JIS K-5400)[1] (10% NaOHaq, 25° C, 7 days) | ++ | ++ | ++ | + | + | + | + | | | | — |
| Hot water resistance test (JIS K5400)[1] (50° C, 7 days) | ++ | ++ | ++ | ++ | ++ | ++ | + | | | | — |
| Oil resistance test (JIS K-5664)[1] | + | + | + | + | + | + | + | | | | — |

Table 1-continued

| Run No. | Present invention | | | | | | Comparison | | | | |
|---|---|---|---|---|---|---|---|---|---|---|---|
| | 1 | 2 | 3 | 4 | 5 | 6 | 7 | 8[2] | 9 | 10[3] | 11 |
| (25° C 7 days | | | | | | | | | | | |

Note:
[1]The resistance of a composition consisting of an epoxy resin and polyamide alone (the composition of Run No. 7 not containing a cyclopentadiene resin (I)) was made a standard (+). Better resistances were evaluated as ++, and poorer resistances were evaluated as −.
[2]Prepared by heating at 250° C, for 3 hours using 240 gr of DCPD and 360 gr of xylene.
[3]Synthesis of the cyclopentadiene resin (I) was performed at 270° C. for 3 hours.

It is seen from Table 1 that when the proportion of vinyl acetate in the synthesis of the cyclopentadiene resin is 20 to 60% by weight, the resulting cyclopentadiene resin has superior impact strength and resistance to alkalies and to hot water.

On the other hand, cyclopentadiene resins having a softening point of as high as 175° C., like a resin of cyclopentadiene alone or a cyclopentadiene resin containing a small proportion of vinyl acetate, has inferior compatibility with epoxy resins, and does not give a uniform cured coating.

EXAMPLE 2

Various compositions were prepared by blending a cyclopentadiene resin (I) prepared from equal weight proportions of vinyl acetate and dicyclopentadiene and having a Gardner number of 5 and a bromine number of 60.5 and an epoxy resin (II) having an epoxy equivalent of 490 in varying proportions. The properties of coatings obtained from the resulting compositions were assessed in the same way as in Example 1. The results are shown in Table 2.

Table 2

| Run No. | Present invention | | | | |
|---|---|---|---|---|---|
| | 1 | 2 | 3 | 4 | 5 |
| Cyclopentadiene resin (weight parts) | 10 | 25 | 50 | 75 | 90 |
| Epoxy resin (weight parts) | 90 | 75 | 50 | 25 | 10 |
| Polyamide (weight parts) | 90 | 75 | 50 | 25 | 10 |
| State of coating | normal | normal | normal | normal | normal |
| Pencil hardness | B | HB | H | HB | B |
| Flexing test (diameter in mm) | below 2 | below 2 | below 2 | below 2 | below 8 |
| Du Pont Impact Test [½" × gr × cm] | 300 × 25 | 300 × 25 | 300 × 25 | 300 × 25 | 300 × 10 |
| Erichsen Cupping Test (mm) | above 8 | above 8 | above 8 | above 8 | above 8 |
| Acid resistance test | + | + | + | + | + |
| Alkali resistance test | + | + | + | + | + |
| Hot water resistance test | ++ | ++ | ++ | + | + |

It is clear from Tables 1 and 2 that even when 90 parts by weight of the cyclopentadiene resin (I) is blended with 10 parts by weight of the epoxy resin (II), the inherent properties of the epoxy resin are not degraded to any significant degree. Accordingly, it is expected that the cost of production can be remarkably curtailed without degrading the properties of the epoxy resin composition. By properly choosing the proportion of the cyclopentadiene resin to be blended, twofold effect of improving the physical and chemical properties of the composition and of reducing the cost of production can be expected.

EXAMPLE 3

Various compositions were prepared from 75 parts by weight of various epoxy resins (II) of varying epoxy equivalents, 25 parts by weight of the same cyclopentadiene resin (I) as used in Example 2 and 75 parts by weight of the same polyamide (III) as used in Example 2. The properties of coatings obtained from the resulting compositions were assessed in the same way as the Example. The results are shown in Table 3.

Table 3

| Run No. | Present invention | | | | |
|---|---|---|---|---|---|
| | 1 | 2 | 3 | 4 | 5 |
| Epoxy equivalent of the epoxy resin | 190 | 450 | 1000 | 1800 | 3700 |
| State of coating | normal | normal | normal | normal | normal |
| Pencil hardness | 2B | HB | HB | B | B |
| Flexing test (diameter in mm) | below 2 | below 2 | below 2 | below 2 | below 2 |
| Du Pont Impact Test [½" × gr × cm] | 300 × 10 | 300 × 25 | 300 × 30 | 300 × 25 | 300 × 20 |
| Erichsen Cupping Test (mm) | 12 | above 8 | above 8 | above 8 | above 8 |
| Acid resistance test | ++ | + | + | ++ | + |
| Alkali resistance test | ++ | + | ++ | + | + |
| Hot water resistance test | + | ++ | ++ | ++ | ++ |
| Oil resistance test | + | + | + | + | + |

EXAMPLE 4

Compositions were prepared from 25 parts by weight of a cyclopentadiene resin (I) synthesized in the same way as in Example 1 except that each of the compounds shown in Table 4 was used as compound (B) instead of vinyl acetate, 75 parts by weight of an epoxy resin (II) having an epoxy equivalent of 490, and 75 parts by weight of polyamide (III). The properties of coatings obtained from the resulting compositions were assessed in the same way as in Example 1. The results are shown in Table 4.

It is seen from Table 4 that according to this invention, epoxy resin compositions having improved physical and chemical properties can be provided without deteriorating the inherent properties of the epoxy resin. It can also be seen that a cyclopentadiene resin prepared by using a vinyl compound such as styrene not belonging to the compound (B) has poor compatibility with epoxies and does not give a uniform cured coating.

Table 4

| Run No. | Present invention | | | | | | | | Comparison |
|---|---|---|---|---|---|---|---|---|---|
| | 1 | 2 | 3 | 4 | 5 | 6 | 7 | 8 | 9 |
| Cyclopentadiene | | | | | | | | | |

Table 4-continued

| Run No. | Present invention | | | | | | | | Comparison |
|---|---|---|---|---|---|---|---|---|---|
| | 1 | 2 | 3 | 4 | 5 | 6 | 7 | 8 | 9 |
| resin | | | | | | | | | |
| Type of compound(B)[1] | AN | AN | MMA | MMA | EA | EA | A | AA | ST |
| Proportion of compound (B) | 50 | 30 | 50 | 30 | 50 | 30 | 50 | 30 | 50 |
| Proportion of DCPD | 50 | 70 | 50 | 70 | 50 | 70 | 50 | 70 | 50 |
| Softening point | 114 | 102 | 84 | 128 | 43 | 63 | 163 | 110 | 121 |
| Color (Gardner Number) | 7 | 5 | 5 | 4 | 7 | 5 | 9 | 5 | 4 |
| Bromine number | 62.2 | 64.4 | 60.1 | 58.3 | 63.2 | 64.9 | 60.9 | 59.8 | 48.6 |
| state of the coating | normal | normal | normal | normal | normal | normal | normal | normal | abnormal |
| Pencil hardness | B | B | F | H | 2B | B | B | H | |
| Flexing test (diameter in mm) | below 2 | below 2 | below 2 | below 2 | below 2 | below 2 | below 2 | below 2 | |
| Du Pont Impact test [(½")×(gr)×(cm)] | 300 × 25 | 300 × 25 | 1000 × 50 | 500 × 50 | 300 × 30 | 300 × 25 | 300 × 20 | 500 × 50 | Not compatible with epoxy resin |
| Erichsen cupping test (mm) | above 8 | above 8 | above 8 | above 8 | above 8 | above 8 | above 8 | above 8 | |
| Acid resistance test | + | + | + | + | + | + | + | + | |
| Alkali resistance test | + | + | + | + | + | + | ++ | + | |
| Hot water resistance test | ++ | ++ | ++ | ++ | ++ | + | + | ++ | |
| Oil resistance test | + | + | + | + | + | + | + | + | |

Note:
[1]AN:acrylonitrile, MMA: methyl methacrylate, EA: ethyl acrylate A: acrolein, AA: acrylic acid St: styrene

EXAMPLE 5

A cyclopentadiene resin (I) was prepared from 70 parts by weight of dicyclopentadiene (DCPD) and 30 parts by weight each of monoethyl maleate (MEN) or diethyl maleate (DEM) as compound (B). The resulting cyclopentadiene resin (I) was blended with an epoxy resin (II), and the properties of coatings obtained from the composition were assessed in the same manner as in Example 1. The results obtained were almost the same as those obtained in Run No. 4 of Example 4 in which methyl methacrylate was used.

The cyclopentadiene resin (I) prepared above had the following characteristics.

| | DCPD-MEN resin | DCPD-DEM resin |
|---|---|---|
| Softing point (° C) | 145 | 80 |
| Color (Gardner) | 7 | 7 |
| Bromine Number | 63.6 | 58.8 |

EXAMPLE 6

An autoclave was charged with 100 gr of a cyclopentadiene resin prepared from 70% by weight of dicyclopentadiene and 30% by weight of vinyl acetate, having a softening point of 90° C., a Gardner number of 4 and a bromine number of 62.7 and 25 gr of nickel-diatomaceous earth catalyst, and the cyclopentadiene resin was hydrogenated at 260° C. for 3 hours using hydrogen at a pressure of 100 Kg/cm². The hydrogenated resin had a softening point of 85° C., a Gardner number of less than 1, and a bromine number of 6.5.

In the same way as in Example 1, a coating solution was prepared from 25 parts by weight of the hydrogenated cyclopentadiene resin (I) 75 parts by weight of an epoxy resin (II) having an epoxy equivalent of 490 and 75 parts by weight of a polyamide (III). The properties of the coating obtained from the coating solution were assessed. It was found that the coating had the following superior physical and chemical properties.

| State of coating | Normal |
|---|---|
| Pencil hardness | H |
| Flexing test (diameter in mm) | less than 2 |
| Du Pont Impact Test [½" × gr × cm] | 500 × 30 |
| Erichsen cupping Text (mm) | above 8 |
| Acid resistance test | + |
| Alkali resistance test | ++ |
| Hot water resistance test | ++ |
| Oil resistance test | + |

EXAMPLE 7

A 500 ml. flask was charged with 100 g of a cyclopentadiene resin obtained in the same way as in Example 1 and varying amounts of maleic anhydride, and the contents were heated at 200° C. for 5 hours to form maleic anhydride-modified cyclopentadiene resins of varying acid values.

Coating solutions were prepared from 100 parts of each of the modified cyclopentadiene resins, 100 parts of the same epoxy resin as used in Example 1 and 70 parts by weight of the same polyamide as used in Example 1. The properties of the coatings obtained from the coating solutions were assessed in the same way as in Example 1. The results are shown in Table 5.

The above coating solutions were prepared by mixing proper amounts of the following solutions (a) to (c).

| (a) | Epoxy resin solution | | |
|---|---|---|---|
| | Epoxy resin | 50 | parts by weight |
| | Methyl isobutyl ketone | 16 | " |
| | Ethyl cellosolve | 17 | " |
| | Xylene | 17 | " |
| | | 100 | " |
| (b) | Maleic anhydride-modified cyclopentadiene resin solution | | |
| | Maleic anhydride-modified cyclo pentadiene resin | 50 | parts by weight |
| | Methyl isobutyl ketone | 16 | " |
| | Ethyl cellosolve | 17 | " |
| | Xylene | 17 | " |
| | | 100 | " |
| (c) | Curing agent solution | | |
| | Polyamide | 50 | parts by weight |
| | Ethyl cellosolve | 25 | " |
| | Xylene | 25 | " |

Table 5

| Run No. | Present invention | | | | | | Comparison | | | |
|---|---|---|---|---|---|---|---|---|---|---|
| | 1 | 2 | 3 | 4 | 5 | 6 | 7 | 8 | 9 | 10 |
| maleic anhydride-modified cyclopentadiene resin monomers(parts by weight) | | | | | | | | | | |
| Dicyclopentadiene | 80 | 70 | 70 | 70 | 50 | | 100[1] | 100[1] | 100[1] | 70 |
| Vinyl acetate | 20 | 30 | 30 | 30 | 50 | | 0 | 0 | 0 | 30 |
| maleic anhydride | 9.6 | 4.6 | 9.6 | 21.2 | 9.6 | | 0 | 9.6 | 21.2 | 35.9 |
| Softening point (° C) | 116 | 105 | 113 | 140 | 95 | | 95 | 115 | 146 | 183 |
| Acid number (JIS K5902) | 51.0 | 25.5 | 51.5 | 105.0 | 51.5 | | 0 | 50.5 | 101.0 | 155.0 |
| Bromine number | 47.0 | 54.6 | 46.3 | 34.0 | 47.1 | | 72.0 | 57.1 | 39.0 | 32.3 |
| Gardner color | 6 | 6 | 7 | 8 | 7 | | 3 | 5 | 7 | 10 |
| State of the coating | normal | normal | normal | normal | normal | normal | abnormal | abnormal | abnormal | abnormal |
| Pencil hardness | 2H | 3H | 3H | 3H | 2H | 3H | Not compatible with epoxy resin | Not compatible with epoxy resin | Not compatible with epoxy resin | Not compatible with epoxy resin |
| Flexing test (mm) | below 2 | below 2 | below 2 | below 2 | below 2 | below 2 | | | | |
| DuPont Impact text[(½"×(gr)×(cm)] | 500 × 50 | 1000 × 50 | 500 × 50 | 500 × 50 | 500 × 50 | 500 × 50 | | | | |
| Erichsen cupping test (mm) | above 8 | above 8 | above 8 | above 8 | above 8 | above 8 | | | | |
| Acid resistance test[2] | + | + | + | + | + | + | | | | |
| Alkali resistance test | ++ | ++ | ++ | + | + | − | | | | |
| Hot water resistance test[2] | ++ | ++ | ++ | ++ | ++ | + | | | | |
| Oil resistance test[2] | ++ | ++ | ++ | ++ | ++ | ++ | | | | |

Note:
[1]Prepared by polymerizing at 250° C for 3 hours using 240 gr of dicyclopentadiene and 360g of xylene.
[2](++) when no change occurred in the appearance of the coating; (+) when slight cloud occurred; and (−) when marked cloud occurred and the coating was swollen.

As is shown in Table 5, the epoxy resin compositions (Runs Nos 1 to 5) containing the maleic anhydride-modified cyclopentadiene resin have improved alkali resistance and hot water resistance without impairing their oil resistance and impact strength as compared with the composition consisting only of an epoxy resin and a curing agent (Run No. 6) without incorporating the maleic anhydridemodified cyclopentadiene resin. On the other hand, the cyclopentadiene resins not containing vinyl acetate copolymerized therewith (Runs Nos. 7 to 9) give coatings having a non-uniform and non-transparent surface and inferior mechanical properties since they have poor compatibility with epoxy resins. It can also be seen from the results of Run. No. 10 that a cyclopentadiene resin having vinyl acetate copolymerized with it and an acid value of above 150 has poor compatibility with epoxy resins, and cannot form a composition which gives a good quality coating.

EXAMPLE 8

Various compositions were prepared from the same maleic anhydride-modified cyclopentadiene resin and epoxy resin as used in Run No. 3 of Example 7. The properties of the coatings obtained from these compositions were assessed in the same way as in Example 7. The results are shown in Table 6.

Table 6

| Run No | 1 | 2 | 3 | 4 |
|---|---|---|---|---|
| Maleic anhydride-modified cyclopentadiene resin (parts by weight:%)* | 50(33) | 100(50) | 100(67) | 400(80) |
| Epoxy resin (parts by weight:%)* | 100(67) | 100(50) | 100(33) | 100(20) |
| Polyamide (parts by weight) | 70 | 70 | 70 | 70 |
| State of coating | Normal | Normal | Normal | Normal |
| Pencil hardness | 3H | 3H | HB | HB |
| Flexing test (diameter in mm) | below 2 | below 2 | below 2 | below 2 |
| Du Pont Impact Text [grycm:½"] | 1000 × 50 | 500 × 50 | 500 × 50 | 500 × 30 |
| Erichsen Cupping Test (mm) | above 8 | above 8 | above 8 | above 8 |
| Acid resistance test | + | + | + | + |
| Alkali resistance test | ++ | ++ | ++ | + |
| Hot water resistance test | ++ | ++ | ++ | ++ |
| Oil resistance test | ++ | ++ | ++ | ++ |

*The figures shown in the parentheses are percentages based on the total amount of the cyclopentadiene resin and the epoxy resin.

It is seen from Table 6 that the compositions of this invention have superior alkali resistance and hot water resistance without impairing the oil resistance.

EXAMPLE 9

Example 7 was repeated except that acrylonitrile and methyl methacrylate was used as compound (B) instead of vinyl acetate in the synthesis of maleic anhydridemodified cyclopentadiene resin. The coatings obtained were assessed in the same way as in Example 7. The same assessment was done using styrene and 1,3-pentadiene (which are not included within the compound (B)) instead of the compound (B). The results are shown in Table 7.

It is seen from Table 7 that the compositions of this invention exhibit improved physical and chemical properties without degrading the inherent properties of the epoxy resins. In contrast, the compositions containing cyclopentadiene resins prepared by using compounds not included within the definition of compound (B) do not give coatings of good quality because such cyclopentadiene resins have poor compatibility with epoxy resins.

vinyl acetate with epoxy resins did not give normal coatings because of the poor compatibility of these Table 7

| Run No. | Present invention | | comparison | | | | |
|---|---|---|---|---|---|---|---|
| | 1 | 2 | 3 | 4 | 5 | 6 | 7 |
| Maleic anhydride-modified cyclopentadiene resin Monomers (parts by weight) | | | | | | | |
| Dicylopentadiene | 70 | 70 | 70 | 70 | 70 | 70 | 70 |
| Acrylonitrile | 30 | 0 | 0 | 0 | 0 | 0 | 0 |
| methylmethacrylate | 0 | 30 | 0 | 0 | 0 | 0 | 0 |
| Styrene | 0 | 0 | 30 | 30 | 0 | 0 | 0 |
| 1,3-pentadiene | 0 | 0 | 0 | 0 | 30 | 30 | 30 |
| Maleic anhydride | 9.6 | 9.6 | 0 | 9.6 | 0 | 9.6 | 21.2 |
| Acid number | 50.5 | 51.5 | 0 | 52.0 | 0 | 51.5 | 102.0 |
| Softening point(° C) | 125 | 132 | 110 | 132 | 100 | 122 | 149 |
| Gardner color | 7 | 7 | 5 | 8 | 4 | 7 | 8 |
| Bromine number | 47.4 | 48.6 | 48.6 | 35.7 | 64.5 | 38.3 | 38.8 |
| State of coating | normal | normal | abnormal | abnormal | abnormal | abnormal | abnormal |
| Pencil hardness | 2H | H | | | | | |
| Flexing test (diameter in mm) | below 2 | below 2 | not compatible with epoxy resin | | | | |
| Du Pont Impact text [(½")×(gr)×(cm)] | 500×50 | 500×50 | | " | " | " | " |
| Erichsen Cupping test (mm) | above 8 | above 8 | | | | | |
| Acid resistance test | + | + | | | | | |
| Alkali resistance test | + | + | | | | | |
| Hot water resistance test | ++ | ++ | | | | | |
| Oil resistance test | ++ | ++ | | | | | |

EXAMPLE 10

480 g of reaction mixture consisting of the following compounds in the amounts indicated and 120 gr of xylene were charged into a 1-liter autoclave, and reacted at 260° C. for 3 hours in an atmosphere of nitrogen. The cyclopentadiene resins shown in Table 8 were obtained by removing the solvent and the unreacted materials by distillation.

Table 8

| Cyclopentadiene resins | α | β | γ |
|---|---|---|---|
| Amounts charged | | | |
| Dicyclopentadiene (gr) | 288 | 432 | 384 |
| Vinyl acetate (gr) | 144 | 0 | 0 |
| Maleic anhydride (gr) | 48 | 48 | 96 |
| Characteristics | | | |
| Acid value | 46.5 | 53.4 | 97.3 |
| Softening point | 55 | 164 | 115 |
| Gardner color | 6 | 6 | 5 |
| Bromine number | 58.7 | 57.6 | 60.3 |

Using the above cyclopentadiene resins α, β and γ, specimens were prepared by the same method as in Example 7, and quite the same assessment as in Example 7 was done. It was found that compositions obtained by blending the resins β and γ not containing vinyl acetate with an epoxy resin gave a coating having the following superior properties.

Table 9

| Item of assessment | Result |
|---|---|
| State of the coating | Normal |
| Pencil hardness | 2H |
| Flexing test diameter in mm) | less than 2 |
| Du Pont Impact Test [gr × cm, ½" ball] | 1000 × 50 |
| Erichsen cupping Test (mm) | above 8 |
| Acid resistance test | + |
| Alkali resistance test | ++ |
| Hot water resistance test | ++ |
| Oil resistance test | ++ |

REFERENTIAL EXAMPLE

Example 7 was repeated using commercially available petroleum resins and others as such or as modified with maleic anhydride. As a result of assessment, these petroleum resins and others were found to have poor compatibility with epoxy resins, and the resulting compositions did not give coatings of good quality.

The petroleum resins and others used are shown in Table 10.

Table 10

| Petroleum resins | A | A | A | B | B | B | C | C | D | D | E | F |
|---|---|---|---|---|---|---|---|---|---|---|---|---|
| Amount of maleic anhydride used (parts per 100 parts of the resin) | 0 | 9.6 | 21.2 | 0 | 9.6 | 21.2 | 0 | 9.6 | 0 | 9.6 | 0 | 0 |
| Acid number | 0 | 52.5 | 110.3 | 0 | 51.0 | 105.5 | 0 | 552.1 | 0 | 50.2 | 3.0 | 14.0 |
| Softening point (° C) | 120 | 138 | 156 | 1100 | 109 | 138 | 105 | 129 | 118 | 134 | 85 | 158 |
| Color (Gardner) | 5 | 8 | 11 | 7 | 9 | 13 | 12 | 15 | 7 | 9 | 8 | 11 |

A: C, petroleum resin (NEOPOLYMER 120, supplied by Nippon Sekiyu Kagaku

Table 10-continued

| Petroleum resins | A | A | A | B | B | B | C | C | D | D | E | F |
|---|---|---|---|---|---|---|---|---|---|---|---|---|

Kabushiki Kaisha)
B: C₅ petroleum resin (ESCOREZ 1102B, supplied by Tonen Sekiyu Kagaku Kabushiki Kaisha)
C: dicyclopentadiene-type petroleum resin (PICCODIENE 2215, supplied by Hercules, Inc.)
D: coumarone resin (COUMARONE AH, supplied by Ouchi Shinko Kabushiki Kaisha)
E: rosin ester (ESTERGUM AAG, supplied by Arakawa Rinsan Kogyo Kabushiki Kaisha)
F: phenol-modified rosin (BECKACITE 1126, supplied by Japan Reichhold Chemicals, Inc.)

What we claim is:

1. An epoxy resin composition comprising (I) 10 to 70% by weight of a cyclopentadiene resin, (II) 90 to 30% by weight of an epoxy resin (II) and an effective amount of a curing agent for the epoxy resin, said cyclopentadiene resin (I) being prepared by thermal polymerization of the following mixture without polymerization catalysts, said mixture consisting of
   A. 85 to 35% by weight of a compound selected from the group consisting of cyclopentadiene, dicyclopentadiene, methylcyclopentadiene, methylcyclopentadiene dimer, cyclopentadiene and methylcyclopentadiene trimer and tetramer, and
   B. 15 to 65% by weight of at least one compound selected from the group consisting of unsaturated nitriles containing 3 to 6 carbon atoms, unsaturated monocarboxylic acids containing 3 to 4 carbon atoms, unsaturated monocarboxylic acid containing 3 to 4 carbon atoms and glycides or aliphatic alcohols containing 1 to 8 carbon atoms, alkenyl alkanoates derived from aliphatic monocarboxylic acids containing 1 to 4 carbon atoms and vinyl alcohol or allyl alcohol, α,β-unsaturated dicarboxylic acids containing 4 to 5 carbon atoms, mono- and di-esters derived from α, β-unsaturated dicarboxylic acids containing 4 to 5 carbon atoms an aliphatic alcohols containing 1 to 8 carbon atoms, and unsaturated aldehydes containing 3 to 6 carbon atoms,
   C. 0 to 30% by weight of α, β-unsaturated dicarboxylic anhydrides containing 4 to 5 carbon atoms, and
   D. 0 to 30% by weight of unsaturated hydrocarbon compounds containing 3 to 10 carbon atoms, and having an acid number of not more than 150, a bromine number of not more than 75 and a softening point of not more than 170° C.

2. The epoxy resin composition of claim 1 wherein said cyclopentadiene resin (I) has an acid number of not more than 100.

3. The epoxy resin composition of claim 1 wherein said cyclopentadiene resin (I) has a bromine value of not more than 50.

* * * * *